Sept. 9, 1952 J. T. WISSMANN 2,610,257

MAGNETIC RECORD VOLUME CONTROL

Filed Dec. 22, 1949 2 SHEETS--SHEET 1

INVENTOR.
JOSEPH T. WISSMANN
BY
Carl R. Lochner
ATTORNEY

Sept. 9, 1952 J. T. WISSMANN 2,610,257

MAGNETIC RECORD VOLUME CONTROL

Filed Dec. 22, 1949 2 SHEETS—SHEET 2

INVENTOR.
JOSEPH T. WISSMANN

BY [signature]

ATTORNEY

Patented Sept. 9, 1952 2,610,257

UNITED STATES PATENT OFFICE 2,610,257

MAGNETIC RECORD VOLUME CONTROL

Joseph T. Wissmann, Burbank, Calif., assignor to Warner Bros. Pictures, Inc., Burbank, Calif., a corporation of Delaware Application December 22, 1949, Serial No. 134,547

9 Claims. (Cl. 179—100.2)

This invention relates to magnetic sound recording and reproduction, and particularly relates to a method of and system for varying the level of a magnetic sound record by actually varying the dimensions of the sound track or record itself.

In the photographic sound recording art, variable density sound records having a constant width and varying density have been varied in average level by varying the width of the track, such a track being known as a "squeeze track." This has also been done with the variable area type of record, as disclosed and claimed in Livadary U. S. Patent No. 2,239,505 of April 22, 1941. The present invention is directed to a method of and system for varying the level of a magnetic record by varying the width of the record, either unilaterally or bilaterally, and is particularly suitable for producing a magnetic record having a uniform average level throughout its length. The level variation may be automatically controlled, as disclosed and claimed in Kreuzer U. S. Patent No. 2,320,524 of June 1, 1943.

It is well-known, in the production of motion pictures, that the various picture sequences and the concomitant sound therefor are made at different times, and the sound sequences do vary in average level. In combining the sequences into a continuous film roll, it is desirable that all the sound sequences have the same average level, so that the level when initially set in the theater, is uniform throughout the picture. The present invention provides a system whereby these levels may be varied simply and without the introduction of distortion.

The principal object of the invention, therefore, is to facilitate the production of a magnetic sound record.

Another object of the invention is to provide an improved method of and means for varying the amplitude level of a magnetic sound record by actually varying the dimension of the record itself.

A further object of the invention is to provide an improved level controlling system for magnetic records.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figures 1, 2, 4:
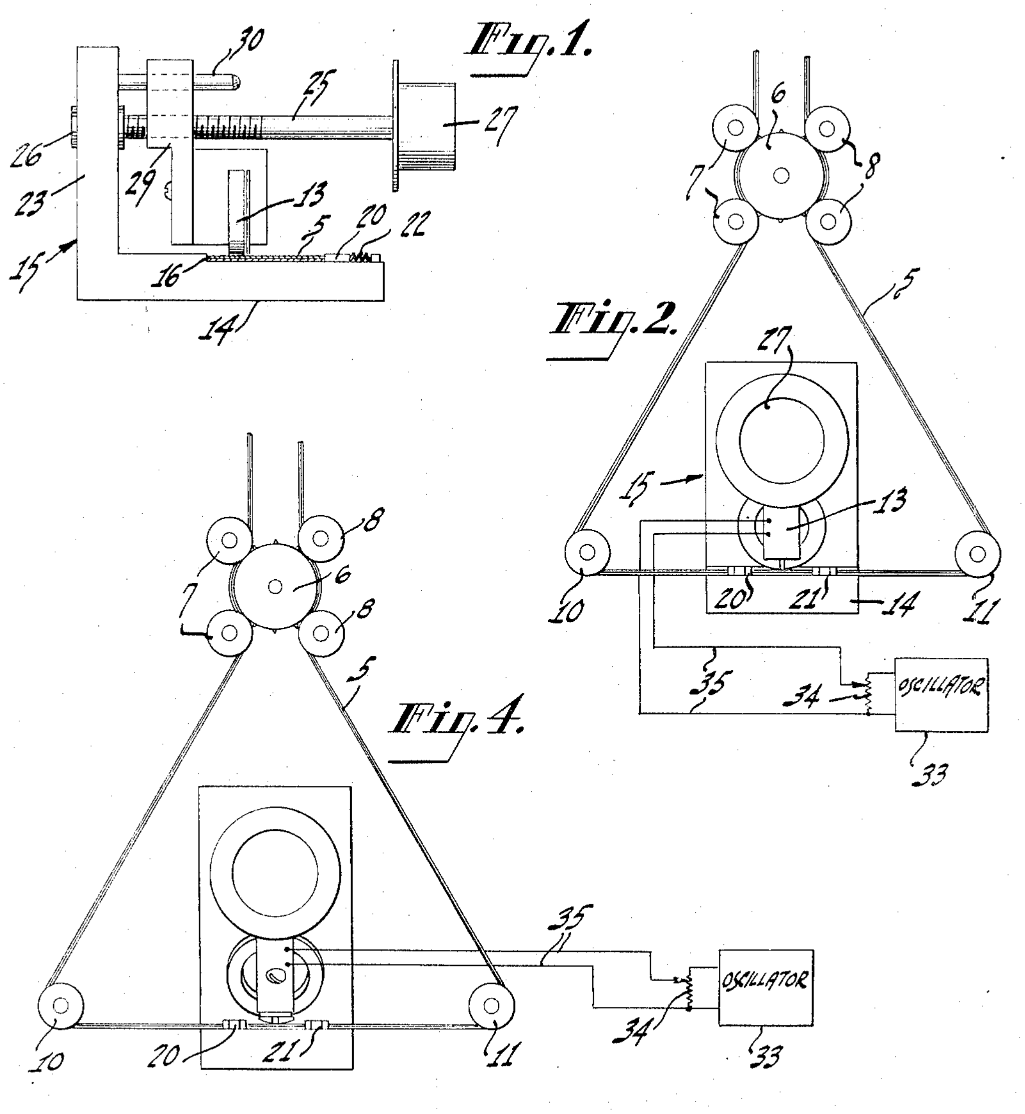
Fig. 1 is a side view of a unilateral level or volume varying device embodying the invention.
Fig. 2 is an end view of the device of Fig. 1, together with a magnetic film advancing system.
Fig. 4 is an end view of the device of Fig. 3, together with a magnetic film advancing mechanism.

Referring now to the drawings, in which the same numerals identify like elements, and referring particularly to Figs. 1 and 2, a magnetic film of any standard type is shown at 5 being advanced around a sprocket 6 having pad rollers 7 and 8, and passed around guide rollers 10 and 11 under a magnetic erase head 13. The film 5 is supported in a notch on the horizontal portion 14 of an L-shaped bracket 15. The magnetic film has one edge abutting a shoulder 16 of the notch and the other edge abutting a pair of spring-pressed blocks 20 and 21, block 20 being shown with its pressure spring 22. In this manner, the magnetic film is accurately edge guided at all times, and particularly as it passes the erasing gap of the head 13.

Mounted on the vertical portion 23 of the L-shaped bracket 15, is a threaded rod or screw 25, which is rotatable in a bearing 26 and which may be rotated by hand knob 27. The head 13 is mounted on a bracket 29, which is threaded on the rod 25, and which is guided by a pin 30 fixedly attached to the upper end of the vertical portion 23 of the bracket 15 and on which the bracket 29 is slidable. Thus, rotation of the knob 27 will move the head 13 transversely of the film 5, and, as high frequency erasing current is supplied from an oscillator 33 under control of potentiometer 34 over conductors 35, the magnetic track on the film 5 will be erased in accordance with the position of the head 13. The knob 27 may be calibrated to indicate the amount of movement of the head 13 and its position at any one time.

Figure 5:
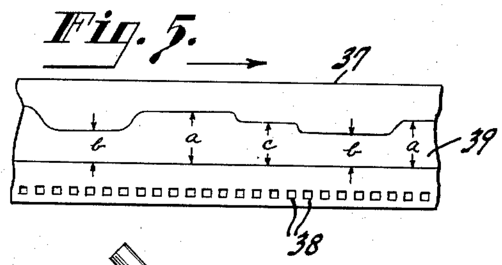
Figs. 5 and 6 illustrate track variations made with the devices of Figs. 1 and 3, respectively.
Figure 8:
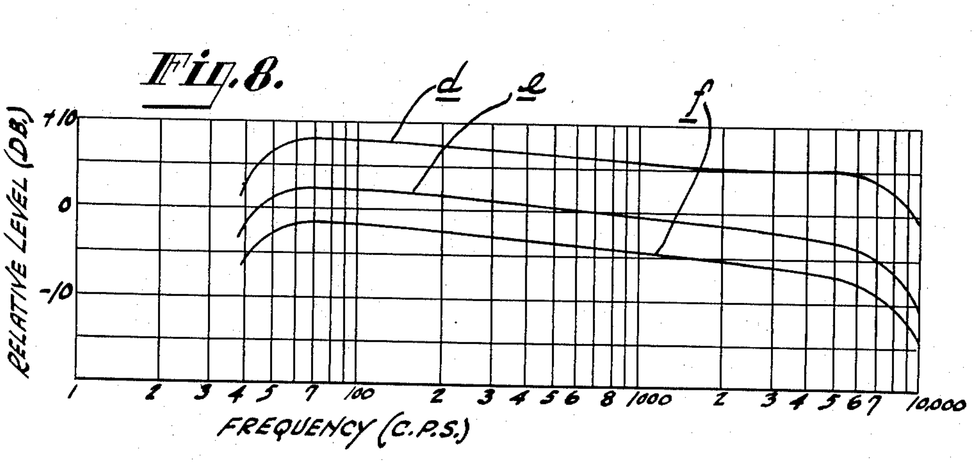
Fig. 8 is a graph showing the frequency characteristics of a magnetic record after variations in volume thereof.

For instance, to illustrate the erasing action of the head 13, a film 37 in Fig. 5, which may be of the sixteen millimeter type having a single row of sprocket holes 38, has shown represented thereon a magnetic sound track 39, which, of course, is invisible, but which is positioned on the film as indicated. The full or maximum width of the track is shown by the dimension *a*. Now, should the film be moving in the direction of the arrow and the head 13 moved toward the track, a portion may be erased to such an extent that the remaining portion has the dimension *b*. This would reduce the level in proportion to the variation in width between the dimensions *a* and *b*. The level may then be increased somewhat by moving the head back again to provide a track width having the dimension *c*. The head may then be moved away from the track, which will return it to full width again. At all times, sufficient high frequency energy is supplied to the head to completely erase the portion in contact with the head and any fringing effects have not been found to be detrimental nor do they introduce distortion to any material degree. This is shown by the curves in Fig. 8, whereby curve *d* represents the track level at full width, such as represented by the dimension *a* in Fig. 5; curve *e* showing the characteristic with a reduction in level by decreasing the width of the track to dimension *c*; curve *f* showing the characteristic with a reduction in level to a track width of dimension *b*. It will be observed from the curves *d*, *e*, and *f*, that the frequency characteristic remains substantially the same during these reductions in average level of the sound track. Thus, the final magnetic record is made up of various sequences which originally had different average levels, but after modification, have varying widths to provide the same average level for all sequences.

Figure 3:
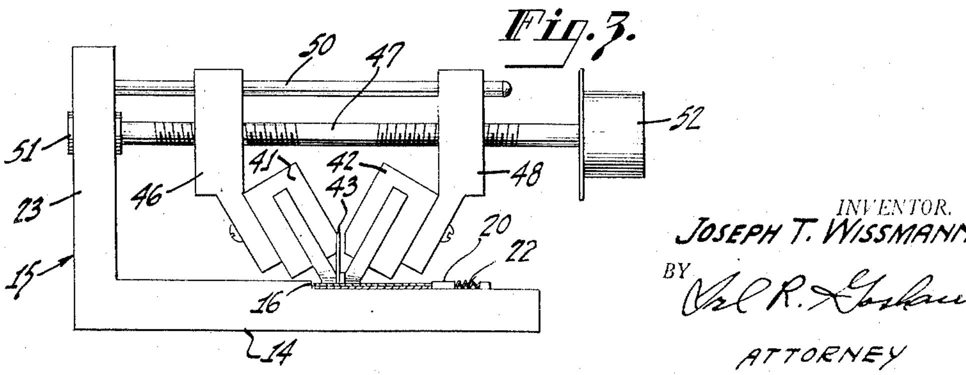
Fig. 3 is a side view of a bilateral volume varying device embodying the invention.

To provide a bilateral track width variation, the device shown in Figs. 3 and 4 may be employed, wherein the same bracket 15 has the same horizontal portion 14 and vertical portion 23, and the same edge guiding arrangement, such as shown at 16, 20, 21, and 22. In this arrangement, however, two erasing heads are provided at 41 and 42 with a shield member 43 to prevent interaction between the heads. Head 41 is mounted on an angle bracket 46, threaded with a right-hand thread to a rod or screw 47, while an angle bracket 48 is threaded with a left-hand thread on the screw 47. A guide pin 50 passes through the upper ends of the brackets 46 and 48 and is attached to the upper end of the vertical portion 23. Screw 47 is mounted at one end in a bearing 51 and has a hand knob 52 at the other end thereof, the rotation of which will separate and bring together the two heads 41 and 42. The heads are supplied with high frequency erasing energy from the same source 33 under control of potentiometer 34 and over conductors 35, as shown in Fig. 2, while the same film advancing elements may be used.

Figure 6:
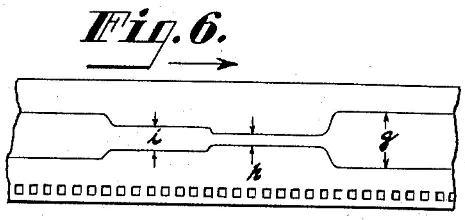

Referring now to Fig. 6, the type of track variation obtained with the system in Figs. 4 and 5 is illustrated, it being understood that the magnetic track is not actually visible. Again, the full track may have the dimension *g*, while one adjustment may decrease the width of the track to the width *h*, and another adjustment may decrease the width to the dimension *i*. As in the case of Fig. 5, variations in levels obtained by these changes in track width may have frequency response characteristics as shown by curves *d*, *e*, and *f* in Fig. 8. Although the variation in volume has been shown as very definite and in the form of steps, it is realized that the volume may be varied by small gradual variations by correspondingly slight amounts of rotation of the hand knobs 27 and 52 at different rates. Furthermore, the length of any track width would generally be longer than illustrated in Figs. 5 and 6, which has been shown short for purposes of explanation.

Figure 7:
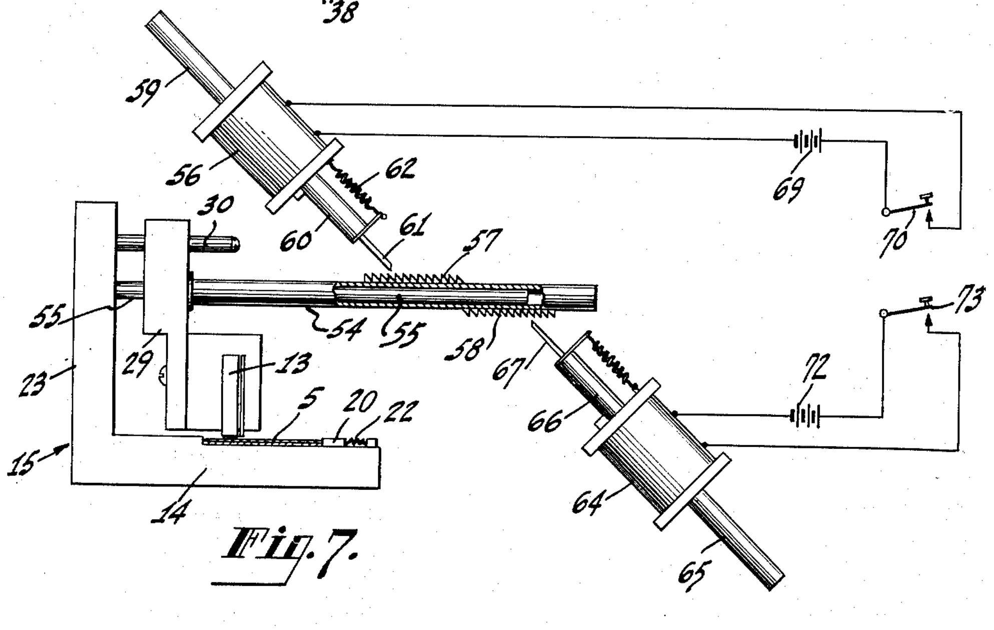
Fig. 7 is a side view of a remote control apparatus for the devices of Figs. 1 and 3.

To illustrate remote control or an automatic system for varying the volume by varying the width of the track, reference is made to Fig. 7, wherein the same basic unit as shown in Fig. 1 is illustrated, but in which the bracket 29 mounted on the end of a sleeve 54 which is slidable on a rod 55 attached to the vertical portion of the bracket 15. The sleeve 54 is provided with opposing saw-tooth racks 57 and 58. Adapted to cooperate with rack 57 is an electro-magnetic unit or solenoid 56 having an armature with a magnetic portion 59 and a non-magnetic portion 60 with an actuating rod 61. Energization of the solenoid 56 will withdraw the magnetic portion 59 within its coil and bring the point of the rod 61 into contact with one of the notches of the rack 57 to move the head 15 the distance of one notch, after which a spring 62 will withdraw the armature 59—60 to rest position where the rod 61 is out of contact with its rack. Similarly, a solenoid 64 having an armature made up of a magnetic portion 65 and a non-magnetic portion 66 with an actuating rod 67 is provided for cooperating with rack 58 to move the head 13 in the opposite direction. The solenoid 56 may be energized from any suitable source, such as a battery 69, upon operation of a contact device, such as a switch 70. Similarly, from an energy supply 72 and a switch 73, the solenoid 64 may be energized.

With the device shown in Fig. 7, therefore, the erasing head 13 may be moved transversely of the film 5 from a remote point, or the switches 70 and 73 may be contact elements of a resistance board such as shown in the above mentioned Kreuzer patent, the board being varied by means of a control track or notches in the original magnetic film record. Since the erasing is complete in the portions erased, a variable width or "squeeze" track type of magnetic record results, which provides a variation in level of a magnetic record which has negligible distortion when the volumes are varied over a considerable range of levels.

Although the invention has been described for varying sound track levels, it may also be used to erase extraneous sounds on a magnetic track medium and the in and out movements of the erase head will be at a rate below audibility now used in the photographic type of blooping.

I claim:

1. A magnetic sound record level varying system comprising means for advancing a magnetic record medium having a sound track thereon of a predetermined width, an erasing magnetic head in contact with said record medium, means for energizing said head with erasing energy, and means for varying the amount of said track in contact with said head for erasing different transverse widths of said track in accordance with the amount of reduction in average level desired.

2. A magnetic sound record level varying system comprising a magnetic record medium having a sound track thereon of a constant predetermined width, an erasing magnetic head in contact with said record medium, means for erasing portions of the record track, said means including, means for energizing said head with erasing energy sufficient to erase the portion of said track in contact with said head, means for advancing said record medium in contact with said head, a support for said head and said record medium, and means for relatively moving said head with respect to said record on said support while in contact with said track and said record is advanced past said head to erase varying transverse widths of said track.

3. A magnetic sound record level varying system in accordance with claim 2, in which said last mentioned means includes an L-shaped bracket, one portion of said bracket supporting said record medium, a threaded rotatable rod through the other portion of said bracket, and means on said rod for rotating said rod.

4. A magnetic sound record level varying system comprising a magnetic record medium having a sound track thereon of a constant predetermined width, an erasing magnetic head, means for advancing said record medium in contact with said head, a support for said head, and means for moving said head on said support while in contact with said record medium and said record medium is advanced past said head, said last mentioned means including a fixed rod on said support, a sleeve on said rod attached to said head, and electro-magnetic means for sliding said sleeve on said rod upon the energization of said electro-magnetic means.

5. A magnetic sound record level varying system comprising a magnetic record medium having a sound track thereon of a constant predetermined width, a pair of magnetic erasing heads in contact with said record medium, means for erasing portions of the record track on said medium, said means including, means for energizing said head with erasing energy sufficient to completely erase the portions of said track in contact with said heads, supports for said heads, and means for moving said heads toward and away from each other while in contact with said track and said record medium is advanced past said head to erase varying widths of said track uniformly about the center line of said track.

6. A magnetic sound record level varying system in accordance with claim 5, in which said last mentioned means includes an L-shaped bracket, one portion of said bracket supporting said record medium, a rotatable rod having left and right-hand threaded portions on which said supports are mounted, said rod being mounted on the other portion of said bracket, and means for rotating said rod.

7. A magnetic sound record level varying system comprising a magnetic record medium having a sound track thereon of a constant predetermined width, a magnetic erasing head, means for erasing portions of said sound track with said head, said means including means for energizing said head with erasing energy, means for advancing said record medium in contact with said head, and electro-magnetic means for relatively moving said head transversely with respect to said track to erase varying transverse widths of said track in accordance with the amount of reduction in average level desired.

8. A magnetic sound record level varying system in accordance with claim 7, in which said last mentioned means includes a pair of solenoids, and means for energizing said solenoids, the energization of one of said solenoids moving said head in one direction, and energization of the other of said solenoids moving said head in the opposite direction.

9. A magnetic sound record level varying system comprising a magnetic record medium having a sound track thereon, a pair of magnetic erasing heads, means for erasing portions of said sound track with said heads, said means including means for energizing said heads with erasing energy, means for advancing said record medium in contact with said heads, and means for simultaneously moving said heads transversely of said track to uniformly erase substantially equal transverse widths of said track to provide a varying width track uniformly disposed about the center line of said track.

JOSEPH T. WISSMANN.

REFERENCES CITED

The following references are of record in the file of this patent:

UNITED STATES PATENTS

| Number | Name | Date |
|---|---|---|
| 873,042 | Hagemann | Dec. 10, 1907 |
| 873,541 | Hagemann | Dec. 10, 1907 |
| 893,277 | Stuart | July 14, 1908 |
| 1,828,190 | Kiliani | Oct. 20, 1931 |
| 1,846,531 | Stille | Feb. 23, 1932 |
| 1,847,860 | Best | Mar. 1, 1932 |
| 1,949,840 | Languepin | Mar. 6, 1934 |
| 2,275,961 | Heller | Mar. 10, 1942 |
| 2,475,694 | Camras | July 12, 1949 |

FOREIGN PATENTS

| Number | Country | Date |
|---|---|---|
| 881,562 | France | Apr. 29, 1943 |